United States Patent
Boss et al.

(10) Patent No.: US 9,736,757 B2
(45) Date of Patent: Aug. 15, 2017

(54) DIGITAL MESSAGE DELIVERY USING AD-HOC DISTRIBUTED DEVICE NETWORKING

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: INTERNATIONLA BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/984,415

(22) Filed: Dec. 30, 2015

(65) Prior Publication Data

US 2017/0195940 A1    Jul. 6, 2017

(51) Int. Cl.
H04W 4/02 (2009.01)
H04W 40/22 (2009.01)
H04W 40/20 (2009.01)
H04M 15/00 (2006.01)

(52) U.S. Cl.
CPC ....... *H04W 40/22* (2013.01); *H04M 15/8083* (2013.01); *H04W 4/023* (2013.01); *H04W 4/027* (2013.01); *H04W 4/028* (2013.01); *H04W 40/20* (2013.01)

(58) Field of Classification Search
CPC .. H04W 40/22; H04W 4/023; H04M 15/8083

USPC ........ 455/404.2, 456.1–6, 421, 422.1, 414.2, 455/423–425, 432.1, 432.3
See application file for complete search history.

(56) References Cited

U.S. PATENT DOCUMENTS

| 7,035,904 | B1 | 4/2006 | Jordan, Jr. |
| 8,160,623 | B1 | 4/2012 | Talley et al. |
| 8,521,135 | B2 | 8/2013 | Cryderman |
| 8,884,817 | B2 | 11/2014 | Seymour |
| 8,942,215 | B2 * | 1/2015 | Mallet ............... H04L 47/38 370/338 |

(Continued)

FOREIGN PATENT DOCUMENTS

WO    WO03094553    11/2003

OTHER PUBLICATIONS

"System and Method for Wireless Communication via a Middlema When Out of Coverage Area", IPCOM000145194D, Jan. 10, 2007, 3 Pages /18K, Canada, The IP.com Prior Art Database.

*Primary Examiner* — Cong Tran
(74) *Attorney, Agent, or Firm* — Cantor Colburn LLP; Kurt Goudy (57) ABSTRACT

Embodiments include method, systems and computer program products for digital message delivery using ad-hoc distributed device networking. In some embodiments, it may be determined that a first device comprising a first device cloud is within a dead zone. A second device with a second device cloud may be identified as a carrier device. Data may be transmitted to the second device cloud of the carrier device using a wireless network connection. An acknowledgement may be received from the first device that the first device cloud of the first device received the data from the second device cloud of the carrier device while in the dead zone.

18 Claims, 4 Drawing Sheets

(56) References Cited

U.S. PATENT DOCUMENTS

| | | | |
|---|---|---|---|
| 9,464,903 B2* | 10/2016 | Sidhu | G01C 21/165 |
| 2014/0235264 A1* | 8/2014 | Venkatraman | H04W 4/02 455/456.1 |
| 2014/0342744 A1* | 11/2014 | Brisebois | H04W 24/02 455/446 |
| 2016/0112864 A1* | 4/2016 | Harber | H04W 4/028 455/432.3 |

* cited by examiner

DIGITAL MESSAGE DELIVERY USING AD-HOC DISTRIBUTED DEVICE NETWORKING

BACKGROUND

The present disclosure relates to methods, systems and computer program products for digital message delivery using ad-hoc distributed device networking.

Despite the proliferation of wireless networks and the ability of mobile devices to connect to a network, such as a cellular or Wi-Fi networks, many locations in the world do not have connectivity to a network available. Such regions may that lack network connectivity may be referred to as "dead zones." Despite the lack of connectivity, people may still need to receive or send digital messages (e.g., text messages, e-mail, etc.). In some scenarios, these known dead zones may not be geographically far from areas that do have network connectivity availability. However, such networks may not be easily reachable or realistically usable for asynchronous communications. Some mechanisms to bring network connectivity to dead zones may be expensive and require special equipment. For example, network providers may install required infrastructure (e.g., cell towers) to provide connectivity for these remote locations. However, such expense may not be fully recovered for the limited population served. People may utilize satellite messaging. However, satellite messaging may require the user to obtain satellite specific devices, which are expensive. Mechanisms to physically deliver and send messages may be utilized. However, postal services may not reach remote locations and may require individuals to travel to a more populated area, which provides mail service. However, such travel may not be convenient or feasible.

SUMMARY

In accordance with an embodiment, a method for digital message delivery using ad-hoc distributed device networking is provided. The method may include determining a first device comprising a first device cloud is within a dead zone; identifying a second device as a carrier device comprising a second device cloud; transmitting data to the second device cloud of the carrier device using a wireless network connection; and receiving an acknowledgement from the first device that the first device cloud of the first device received the data from the second device cloud of the carrier device while in the dead zone.

In another embodiment, a computer program product may comprise a non-transitory storage medium readable by a processing circuit and storing instructions for execution by the processing circuit for performing a method that may include determining a first device comprising a first device cloud is within a dead zone; identifying a second device as a carrier device comprising a second device cloud; transmitting data to the second device cloud of the carrier device using a wireless network connection; and receiving an acknowledgement from the first device that the first device cloud of the first device received the data from the second device cloud of the carrier device while in the dead zone.

In another embodiment, a system for optimizing persistency using hybrid memory may include a processor in communication with one or more types of memory. The processor may be configured to determine a first device comprising a first device cloud is within a dead zone; identify a second device as a carrier device comprising a second device cloud; transmit data to the second device cloud of the carrier device using a wireless network connection; and receive an acknowledgement from the first device that the first device cloud of the first device received the data from the second device cloud of the carrier device while in the dead zone.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for digital message delivery using ad-hoc distributed device networking are provided. This disclosure is directed to delivering and sending digital messages on behalf a device that is not connected to the internet (e.g. in a dead zone) using cellular or Wi-Fi connections. A network of user devices which are constantly traveling in and out of the dead zone may be used in a hybrid mesh network to carry data in and out of the dead zone. Once outside of the dead zone the carrier device may deliver outbound messages and/or receive inbound messages on behalf of the device in the dead zone. Carrier devices may be identified using projected trajectory paths into and out of the dead zone.

The methods and systems described herein may utilize carrier devices whose owners may influence data delivery using, for example, GPS mapping software to define an off-network location to have devices in an online/offline mesh network to carry and pass along data from one device to another until the message reaches its intended destination. The carrier devices may use wireless communication (e.g., Bluetooth™, Wi-Fi, etc.) to transmit the data between devices, so they do not need to be on an internet connected network to transmit and deliver the data to the destination device.

The methods and systems described herein may alleviate the burden on network providers from having to install specialized equipment (e.g., cellular towers) to provide network connectivity scantily populated and/or remote locations (e.g., dead zones). The methods and systems described herein may also aid in the transmission of electronic data (e.g., e-mail, text messages, etc.) where internet connectivity is not available. The methods and systems described herein may deliver data into and out of a dead zone by determining a compatible carrier device's trajectory with respect to a dead zone. This may utilize a multi-device hand-off based solely on the devices GPS or tower triangulation history or by using a projected GPS route or data obtained from the carrier device, such as locations specified in calendar entries. In some embodiments, the data may be segmented into "carrier messages" which may be managed and tracked by the network provider to deal with duplicative messages and messages that are not ultimately delivered to the device in the dead zone. In some embodiments, the methods and systems described herein may be used to introduce connectivity to a geographical location that does not have network connectivity available due to costs or other physical limitations. In some embodiments, data may be transmitted to people in such remote locations.

Figure 1:
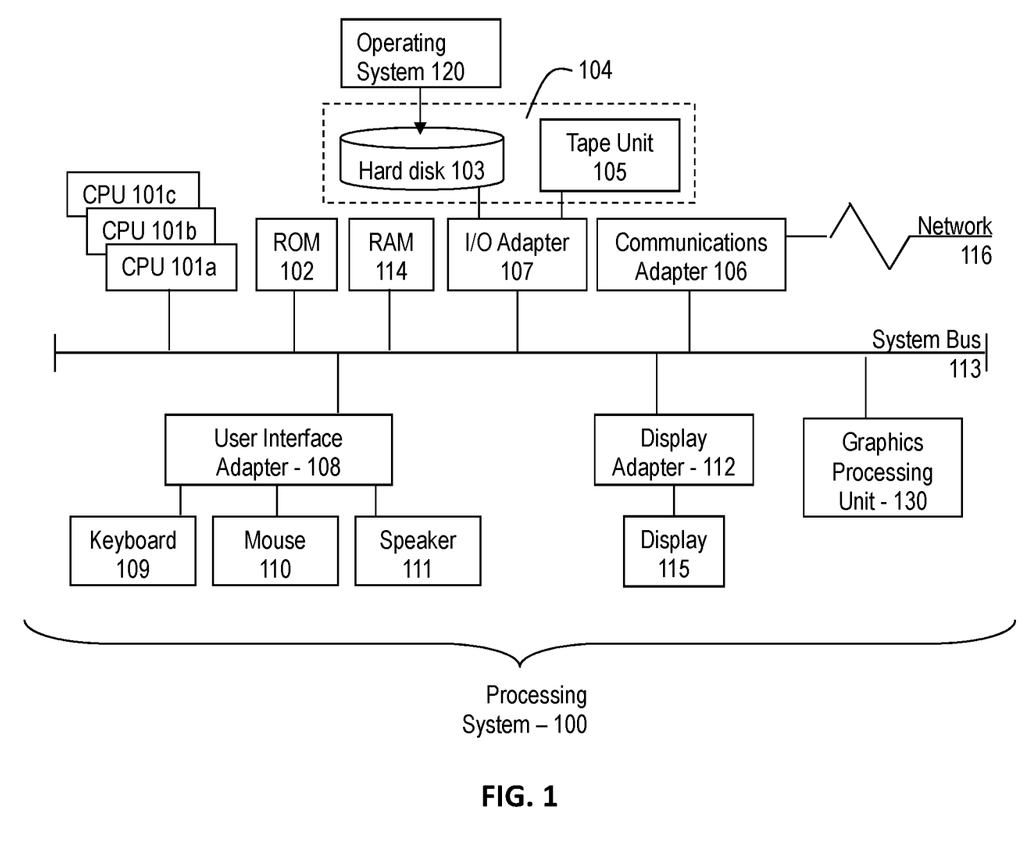
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
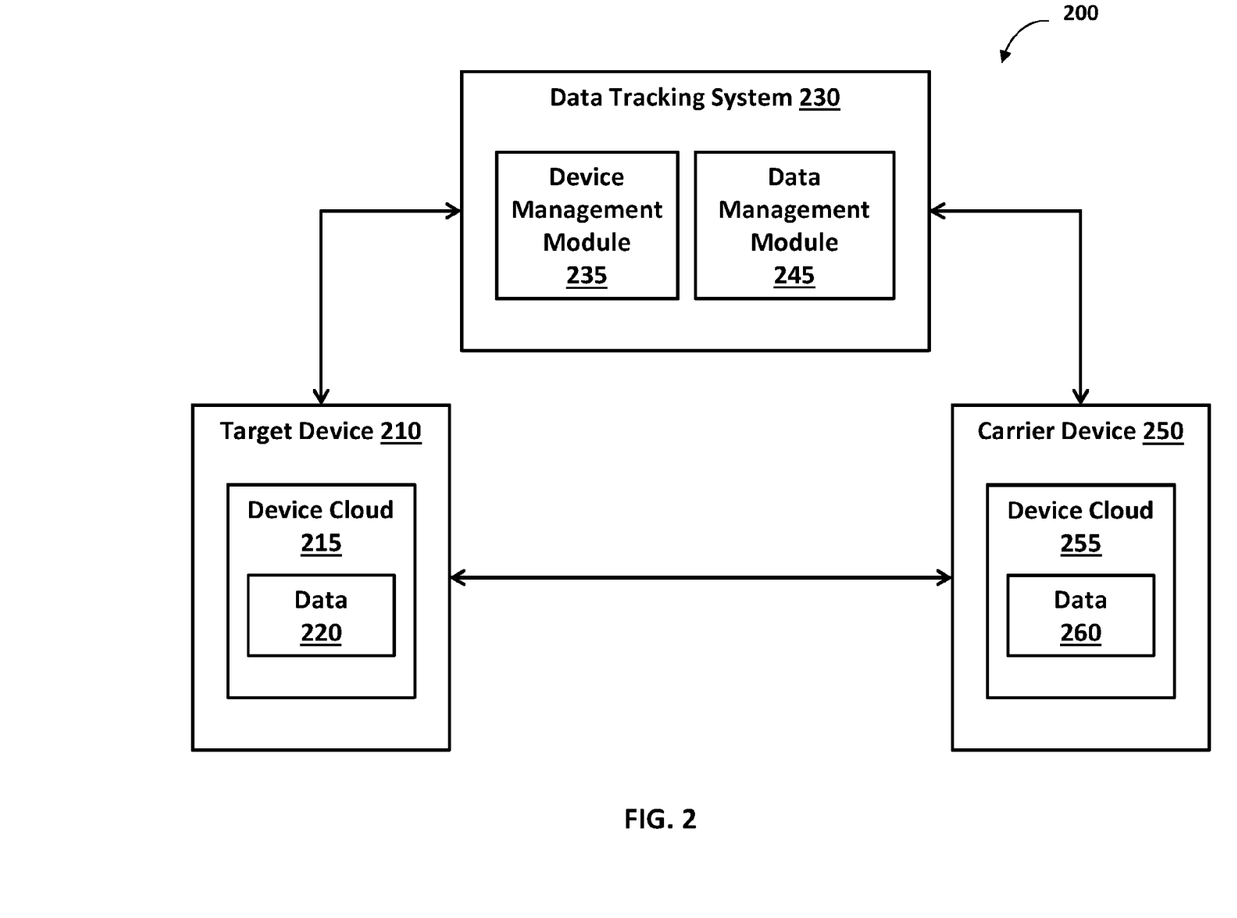
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a target device 210, a data tracking system 230, and a carrier device 250. In some embodiments, the target device 210 may include a device cloud 215, which may store data 220. In some embodiments, the message data system 230 may include a device management module 235 and a data management module 245. In some embodiments, the carrier device 250 may include a device cloud 250, which may store data 260.

In some embodiments, the target device 210 may include a device cloud 215, which may store data 220. The target device 210 maybe any type of portable device that has the capability to connect to a network, such as using Wi-Fi or cellular technologies. Examples of a target device 210 may include smartphones, tablets, laptops, and the like. Additionally, the target device 210 may have capabilities to exchange data with other devices. Examples of device-to-device data exchange mechanisms may include Bluetooth™, Wi-Fi Direct, and the like. Target devices 210 may include a device cloud 215. A device cloud 215 may be a protected segment of memory that is inaccessible by the user of the target device 210. The device cloud 215 may be specifically enabled to send and receive data 220 with another device (e.g., carrier device 250) through a device-to-device connection. The data 220 may include any type of data or messages that require network connectivity for transmission, such as email, text messages, or the like. The data 220 may be encrypted using one or more known encryption mechanisms and may not be directly accessed by users of the devices.

In some embodiments, the data tracking system 230 may include a device management module 235 and a data management module 245. In some embodiments, the data tracking system 230 may be implemented and/or controlled by a network provider, such as a cellular company. The network provider may be able to identify dead zones in their coverage maps and may utilize the systems and methods described herein to facilitate data transmission from such dead zones.

The device management module 235 may include computer-readable instructions that in response to execution by the processor(s) 101 cause operations to be performed including tracking the location of the different target devices 210 and carrier devices 250 within the system. In some embodiments, the device management module 235 may receive information regarding the location of the target device in a dead zone. For example, a user of the target device 210 may register their location and duration at the location in the dead zone prior to traveling to the location. The registration may be through a website, which may then generate a notification to the device management module 235 with the relevant information. In some embodiments, the device management module 235 may use a GPS route requested by the user of the target device 210 to obtain information about travel to a dead zone location. In some embodiments, the device management module 235 may obtain information pertaining to the target device 210 location in a dead zone from other sources, such as location information in a calendar invite, information in an e-mail, user history information (e.g., past travel to the location in the dead zone), or the like. The device management module 235 may determine and/or predict the location of the target device 210 in a dead zone using the obtained information. Once a location in the dead zone has been associated with the target device 210, the device management module 235 may communicate with the data management module 245 to coordinate transmission of data 260 for the target device 210 to the device cloud 255 of one or more carrier devices 250 so that when the carrier device 250 and the target device 210 are within a pre-determine geographic distance from each other, the data 260 may be transmitted device to device, without network connectivity.

In some embodiments, the device management module 235 may identify devices that may be carrier devices 250. Carrier devices 250 may include a device cloud 255, which may store data 260 that may be transmitted between device clouds 215, 255. In some embodiments, the device management module 235 may determine whether a device is a carrier device 250 by predicting whether the device will be traveling into a dead zone to a location close to the target device 210 so that the carrier device 250 may transmit data 260 to the device cloud 215 of the target device 210. In some embodiments, the device management module 235 may predict whether the device is an appropriate carrier device 250 may obtain information, such as a GPS route, location information from a calendar event, email, text, or the like. Upon determining the device is a carrier device 250, the device management module 250 may coordinate with the data management module 245 to transmit data 260 for the target device 210 to the device cloud 255 of the carrier device 250.

The data management module 245 may include computer-readable instructions that in response to execution by the processor(s) 101 cause operations to be performed including coordinating with the device management module 235 to ensure data 260 associated with the target device 210 is transmitted to the device cloud of the 255 of the carrier device 250. When the target device 210 successfully received the data 260 from the carrier device 250, the target device 210 may transmit an acknowledgement to the data management module 245. In some embodiments, the acknowledgement may be transmitted from the device cloud 215 of the target device 210 to the device cloud 255 of the carrier device 250 and the carrier device 250 may ultimately transmit the acknowledgement to the data management module 245 when it is out of the dead zone and able to connect to a network. In some embodiments, the acknowledgement may be queued upon the target device 210 until the target device travels out of the dead zone and is able to connect to a network. In some embodiments, the data management module 245 may have transmitted data associated with the target device 210 to multiple carrier devices 250. Upon receipt of the acknowledgment, the data management module 245 may facilitate the deletion of the data from the carrier devices 250.

In some embodiments, the carrier device 250 may include a device cloud 250, which may store data 260. The carrier device 250 maybe any type of portable device that has the capability to connect to a network, such as using Wi-Fi or cellular technologies. Examples of a carrier device 250 may include smartphones, tablets, laptops, and the like. Additionally, the carrier device 250 may have capabilities to exchange data with other devices. Examples of device-to-device data exchange mechanisms may include Bluetooth™, Wi-Fi Direct, and the like. Carrier devices 250 may include a device cloud 255. A device cloud 255 may be a protected segment of memory that is inaccessible by the user of the carrier device 250. The device cloud 255 may be specifically enabled to send and receive data 260 with another device (e.g., target device 210) through a device-to-device connection. The data 260 may include any type of data or messages that require network connectivity for transmission, such as email, text messages, or the like. The data 260 may be encrypted using one or more known encryption mechanisms and may not be directly accessed by users of the devices. Target devices 210 may become carrier devices 250 and vice versa depending on their location and proximity to a dead zone.

Figure 3:
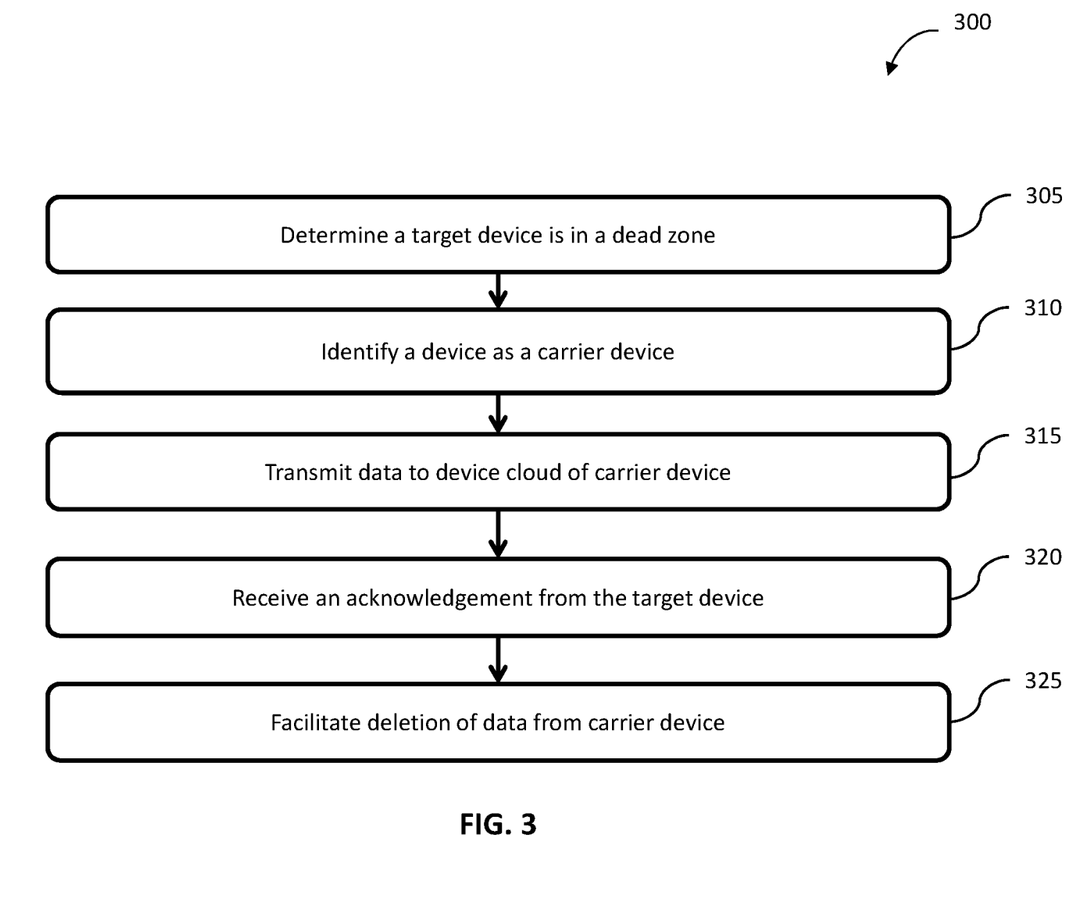
FIG. 3 is a flow diagram of a method for digital message delivery using ad-hoc distributed device networking in accordance with an exemplary embodiment.

Referring now to FIG. 3, a flow diagram of a method 300 for digital message delivery using ad-hoc distributed device networking in accordance with an exemplary embodiment is shown. At block 305, the device management module 235 may determine that a target device 210 is in a dead zone. In some embodiments, the device management module 235 may receive an indication that the target device 210 will be in the dead zone for a specified period of time. For example, a user of the target device 210 may log onto a website and register travel to a destination in a dead zone and duration of that travel. The device management module 235 may receive a notification containing the relevant information and may use the information to track the likely location of the target device 210. In some embodiments, the device management module 235 may determine that a target device 210 will likely be in a dead zone using historic data (e.g., past trips to the location), information obtained from the target device 210 (e.g., GPS routing, location information for calendar events, text messages, emails, etc.). Upon determining that the target device 210 is in or will likely be in a dead zone, the device management module 235 may coordinate with the data management module 245 to queue data being sent to the target device 210 while the target device 210 is in the dead zone.

At block 310, the device management module 235 may identify a device as a carrier device 250. In some embodiments, the device management module 235 may determine that a device is carrier device 250 using historic data (e.g., past trips to the location), information obtained from the target device 210 (e.g., GPS routing, location information for calendar events, text messages, emails, etc.) and comparing the route the device may be taking while in the dead zone and compare it to the known location of the target device 210. If the device is likely to come into close geographic proximity to the target device 210, the device management module 235 may determine that the device is a good carrier device 250. In some embodiments, the device management module 235 may identify multiple carrier devices 250 and may enable the multiple carrier devices 250 for data transmission until it receives an indication that the target device 210 has received the data.

At block 315, the data management module 245 may transmit data to the device cloud 255 of the carrier device 250. Upon identifying the one or more carrier devices 250, the data management module 245 may coordinate and communicate with the data management module 245 to facilitate transmission of data queued for the target device 210 while the target device 210 is in the dead zone to the cloud device 255 of the carrier device 250. In some embodiments, the data management module 245 may only transmit the data 260 a carrier device 250 if it is known that the carrier device 250 will be close proximity to the target device 210 while in the dead zone (e.g., mail or package carrier device making a delivery to the address where the target device 210 is located). In some embodiments, if the device management module 235 has determined that there is some likelihood that the identified carrier device 250 may not come in contact with the target device 210, the data management module 245 may transmit the data 260 to multiple carrier devices 250 to increase the likelihood that at least one of the carrier devices 250 will successfully transmit the data 260 to the target device 210. In some embodiments, each data 260 transmitted to a different carrier device 250 may have a unique identifier associated with it to ensure delivery has been made and all future attempts can be stopped.

In some embodiments, the target device 210 may detect the presence of the carrier device 250 within a predetermined geographic area and may establish a device-to-device connection. In some embodiments, the carrier device 250 may detect the presence of the target device 210 within a predetermined geographic area and may establish a device-to-device connection. Upon establishing a connection, the device cloud 255 of the carrier device 250 may facilitate transmission of the data 260 to the device cloud 215 of the target device 210.

At block 320, the data management module 245 may receive an acknowledgement from the target device 210. In some embodiments, the device cloud 215 of the target device 210 may generate an acknowledgement to receiving the data 260 from the carrier device 250. In some embodiments, the acknowledgment may include the unique identifier associated with the data 260. In some embodiments, the device cloud 215 of the target device 210 may transmit the acknowledgment to the device 255 of the carrier device 250, which may transmit the acknowledgment to the data management module 245 upon leaving the dead zone and connecting to a network. In some embodiments, the device cloud 215 of the target device 210 may generate the acknowledgment and may transmit the acknowledgment to the data management module 245 upon leaving the dead zone and connecting to a network.

At block 325, the data management module 245 may facilitate deletion of data 260 from one or more carrier devices 250. In some embodiments, upon receipt of the acknowledgment from the target device 210 that the data 260 was received from the carrier device 250, the data management module 245 may facilitate deletion of data 260 from the carrier device 250 that delivered the data 260 as well as any other carrier device 250 that may have received the data 260 for possible transmission to the target device 210.

In some embodiments, to ensure that the carrier device 250 and the target device 210 are connected for a sufficient period of time to ensure that the data 260, 220 is adequately transmitted and received, the data tracking system 230 may offer incentives to carrier device 250. For example, the data tracking system 230 may pay a pre-determined amount per unit of data that is carried by the carrier device 250 and delivered to a target device 210. In one embodiment, the data management module 245 may track a counter associated with the carrier device 250 that tracks the data transmitted from the carrier device 250 to a target device 210. Incentive credit may be given to the carrier device 250 (e.g., monetary, network time, etc.) if the counter is equal to or greater than a threshold set by the data tracking system 230. In some embodiments, the counter may be reset upon credit of the incentive to the carrier device 250 or may be maintained for greater incentives in the future.

In some embodiments, the data tracking system 230 may offer different incentives to carrier devices 250 for stopping at the location of the target device 210, slowing down to a specific speed near the target device 210, retracing a small segment of the route near the target device 210, or rerouting a planned route near the target device 210 to aid in the completion of the device-to-device communication of the data 260. In some embodiments, the data tracking system 230 may transmit a notification to the carrier device 250 to take an action upon detecting the first device to earn an incentive, wherein the action is one of stopping within a distance of the first device, slowing down to a specific speed near while in close geographic proximity to the first device; retracing a small segment of a route in close geographic proximity to the first device, or rerouting a planned route to aid in the completion of data transmission between the first device and the carrier device.

Figure 4:
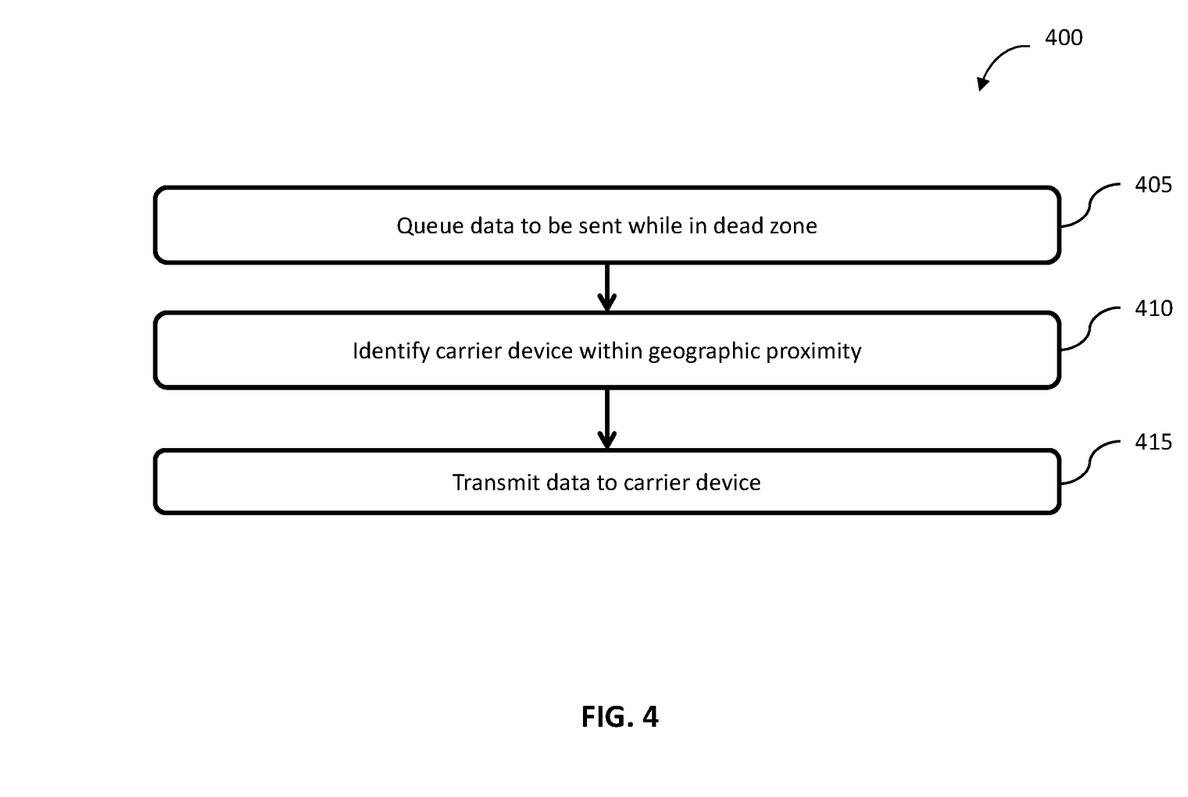
FIG. 4 is a flow diagram of a method for digital message delivery using ad-hoc distributed device networking in accordance with an exemplary embodiment.

Referring now to FIG. 4, a flow diagram of a method 400 for digital message delivery using ad-hoc distributed device networking in accordance with an exemplary embodiment is shown. At block 405, a target device 210 may queue data 220 to be sent while in a dead zone. In some embodiments, the target device 210 may determine that there is no network connectivity available to transmit data 220. The target device 210 may determine to transmit data 220 using ad-hoc distributed device networking. The target device 210 may generate data 220 to transmit that required network connectivity. This data 220 may be queued in the device cloud 215 of the target device 210. In some embodiments, the data 220 may be segmented or parsed into messages or the like. In some embodiments, the data 220 may be encrypted for transmission.

At block 410, the target device 210 may identify a carrier device 250 within geographic proximity of the target device 210. In some embodiments, the target device 210 may detect a carrier device 250 that is within a pre-determined geographic area (e.g., 100 feet).

At block 415, the target device 210 may transmit data to the carrier device 210. The target device 210 and/or carrier device 250 may initiate a secure device-to-device connection. The target device 210 may transmit the queued data 220 to the carrier device 250. The carrier device 250 may receive the data 220 in its device cloud 255. The carrier device 255 may facilitate transmission of the data 220 once it is out of the dead zone and has network connectivity to transmit the data 220 to their destination. In some embodiments, as the device cloud 215 of the target device 210 is transmitting data 220 to the device cloud 255 of the carrier device 250, the device cloud 255 of the carrier device 250 may transmit data 260 for the target device 210 obtained from the data management module 245 to the device cloud 215 of the target device 210. The device cloud 215 of the target device may facilitate the delivery of the data 260 to the appropriate applications of the target device 210 upon receipt of the data 260 from the carrier device 250.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining a first device comprising a first device cloud is within a dead zone;
   identifying a second device as a carrier device comprising a second device cloud;
   transmitting data to the second device cloud of the carrier device using a wireless network connection;
   receiving an acknowledgement from the first device that the first device cloud of the first device received the data from the second device cloud of the carrier device while in the dead zone;
   incrementing a counter associated with the carrier device based on the data transmitted from the carrier device to the first device; and
   facilitating incentive credit to the carrier device based on determining that the counter is equal to or greater than a threshold.

2. The computer-implemented method of claim 1, further comprising:
   receiving an indication that the first device will be in the dead zone for a specified period of time.

3. The computer-implemented method of claim 1, wherein identifying the second device as the carrier device further comprises:
   obtaining route data associated with the second device, wherein the route data is obtained from a requested GPS route associated with the second device or a calendar entry associated with the second device.

4. The computer-implemented method of claim 1, further comprising:
   transmitting the data to a third device cloud of a second carrier device using a wireless network connection; and
   facilitating deletion of the data from the second carrier device in response to receiving the acknowledgement from the first device that the first device cloud of the first device received the data from the second device cloud of the carrier device while in the dead zone.

5. The computer-implemented method of claim 1, further comprising:
   transmitting a notification to the carrier device to take an action upon detecting the first device to earn an incentive, wherein the action is one of stopping within a distance of the first device, slowing down to a specific speed near while in close geographic proximity to the first device; and
   retracing a small segment of a route in close geographic proximity to the first device, or rerouting a planned route to aid in completion of data transmission between the first device and the carrier device.

6. The computer-implemented method of claim 1, further comprising:
   receiving a second data from the carrier device, wherein the second data originated from the first device and was transmitted to the carrier device while in the dead zone; and
   facilitating transmission of the second data.

7. A computer program product comprising a non-transitory storage medium readable by a processing circuit and storing instructions for execution by the processing circuit for performing a method comprising:
   determining a first device comprising a first device cloud is within a dead zone;
   identifying a second device as a carrier device comprising a second device cloud;
   transmitting data to the second device cloud of the carrier device using a wireless network connection;
   receiving an acknowledgement from the first device that the first device cloud of the first device received the data from the second device cloud of the carrier device while in the dead zone;
   incrementing a counter associated with the carrier device based on the data transmitted from the carrier device to the first device; and
   facilitating incentive credit to the carrier device based on determining that the counter is equal to or greater than a threshold.

8. The computer program product of claim 7, the method further comprising:
   receiving an indication that the first device will be in the dead zone for a specified period of time.

9. The computer program product of claim 7, wherein identifying the second device as the carrier device further comprises:
   obtaining route data associated with the second device, wherein the route data is obtained from a requested GPS route associated with the second device or a calendar entry associated with the second device.

10. The computer program product of claim 7, the method further comprising:
    transmitting the data to a third device cloud of a second carrier device using a wireless network connection; and
    facilitating deletion of the data from the second carrier device in response to receiving an acknowledgement from the first device that the first device cloud of the first device received the data from the second device cloud of the carrier device while in the dead zone.

11. The computer program product of claim 7, the method further comprising:
    transmitting a notification to the carrier device to take an action upon detecting the first device to earn an incentive, wherein the action is one of stopping within a distance of the first device, slowing down to a specific speed near while in close geographic proximity to the first device; and
    retracing a small segment of a route in close geographic proximity to the first device, or rerouting a planned route to aid in completion of data transmission between the first device and the carrier device.

12. The computer program product of claim 7, the method further comprising:
    receiving a second data from the carrier device, wherein the second data originated from the first device and was transmitted to the carrier device while in the dead zone; and
    facilitating transmission of the second data.

13. A system, comprising:
    a processor in communication with one or more types of memory, the processor configured to:
    determine a first device comprising a first device cloud is within a dead zone;
    identify a second device as a carrier device comprising a second device cloud;
    transmit data to the second device cloud of the carrier device using a wireless network connection;
    receive an acknowledgement from the first device that the first device cloud of the first device received the data from the second device cloud of the carrier device while in the dead zone;
    increment a counter associated with the carrier device based on the data transmitted from the carrier device to the first device; and
    facilitate incentive credit to the carrier device based on determining that the counter is equal to or greater than a threshold.

14. The system of claim 13, wherein the processor is further configured to:
    receive an indication that the first device will be in the dead zone for a specified period of time.

15. The system of claim 13, wherein, to identify the second device as the carrier device the processor is further configured to:
    obtain route data associated with the second device, wherein the route data is obtained from a requested GPS route associated with the second device or a calendar entry associated with the second device.

16. The system of claim 13, wherein the processor is further configured to:
    transmit the data to a third device cloud of a second carrier device using a wireless network connection; and
    facilitate deletion of the data from the second carrier device in response to receiving an acknowledgement from the first device that the first device cloud of the first device received the data from the second device cloud of the carrier device while in the dead zone.

17. The system of claim 13, wherein the processor is further configured to:
    receive a second data from the carrier device, wherein the second data originated from the first device and was transmitted to the carrier device while in the dead zone; and
    facilitate transmission of the second data.

18. The system of claim 13, wherein the processor is further configured to:
  transmit a notification to the carrier device to take an action upon detecting the first device to earn an incentive, wherein the action is one of stopping within a distance of the first device, slowing down to a specific speed near while in close geographic proximity to the first device; and
  retrace a small segment of a route in close geographic proximity to the first device, or rerouting a planned route to aid in completion of data transmission between the first device and the carrier device.

* * * * *